Jan. 15, 1952     P. E. BATAILLE     2,582,521
MACHINE FOR MINING TENDER STONES
OR OTHER MINERAL SUBSTANCES
Filed Aug. 17, 1945                                4 Sheets-Sheet 4
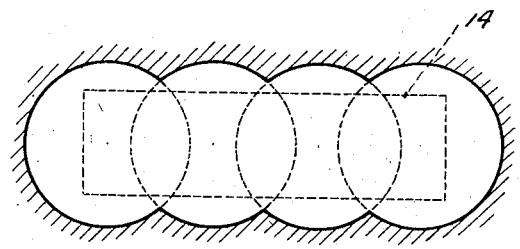
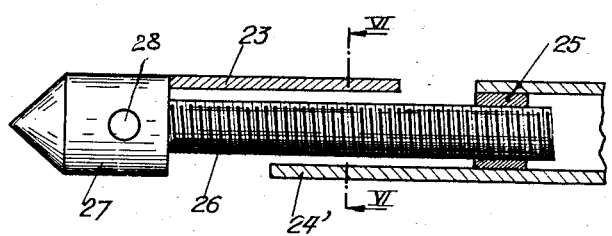
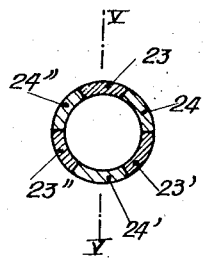
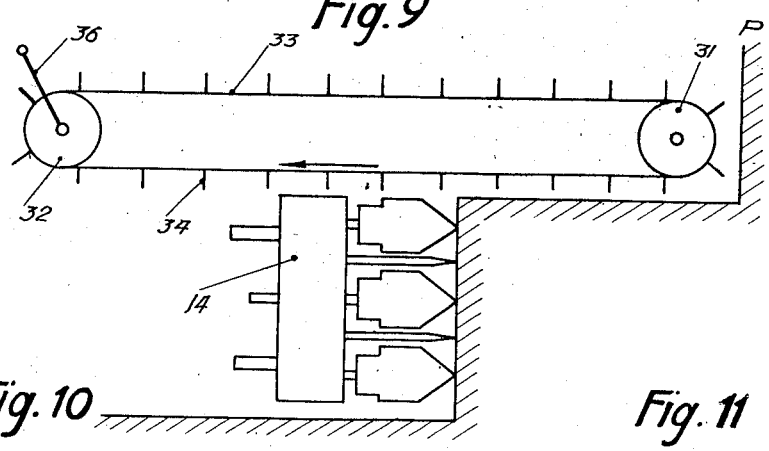
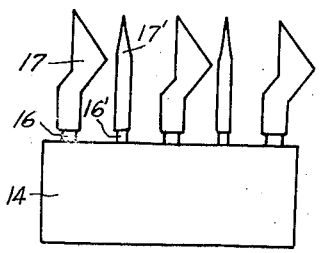
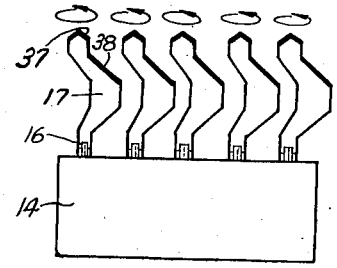
Inventor
P. E. Bataille Patented Jan. 15, 1952

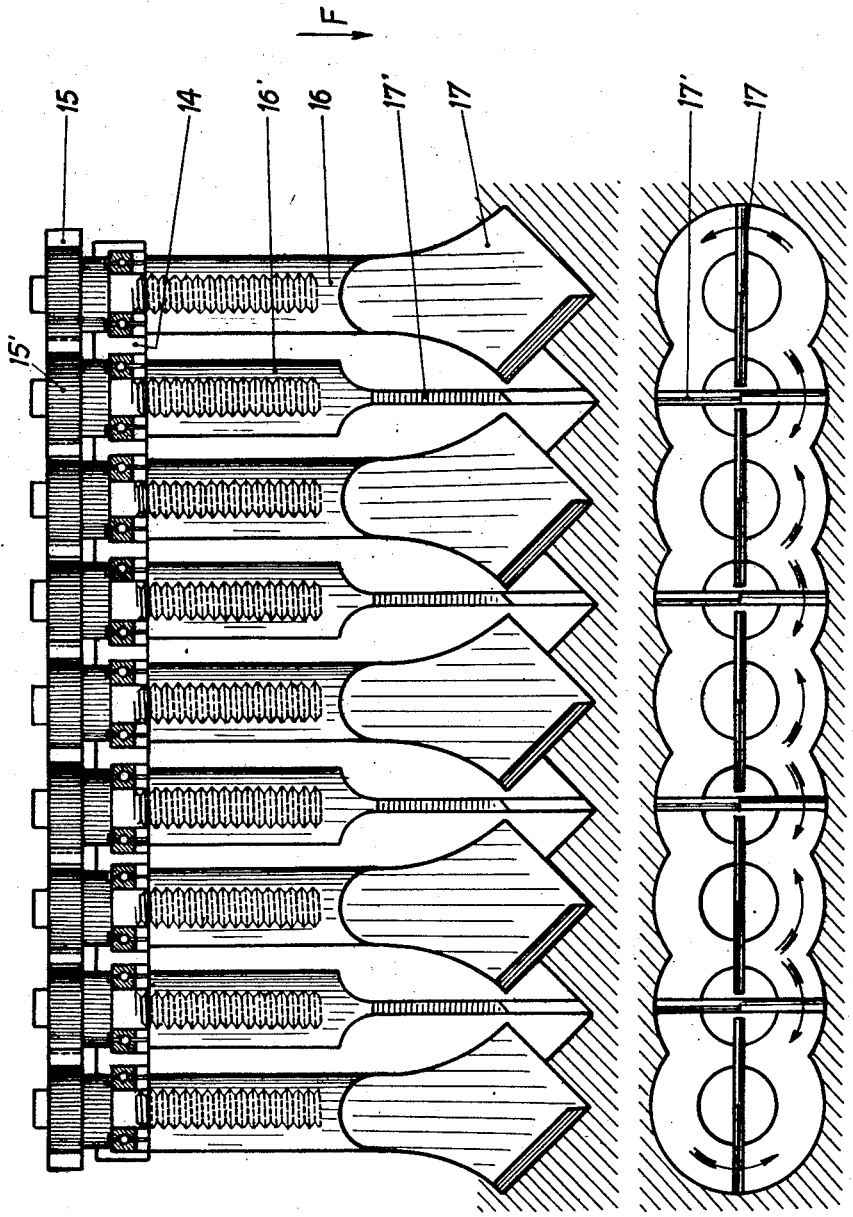

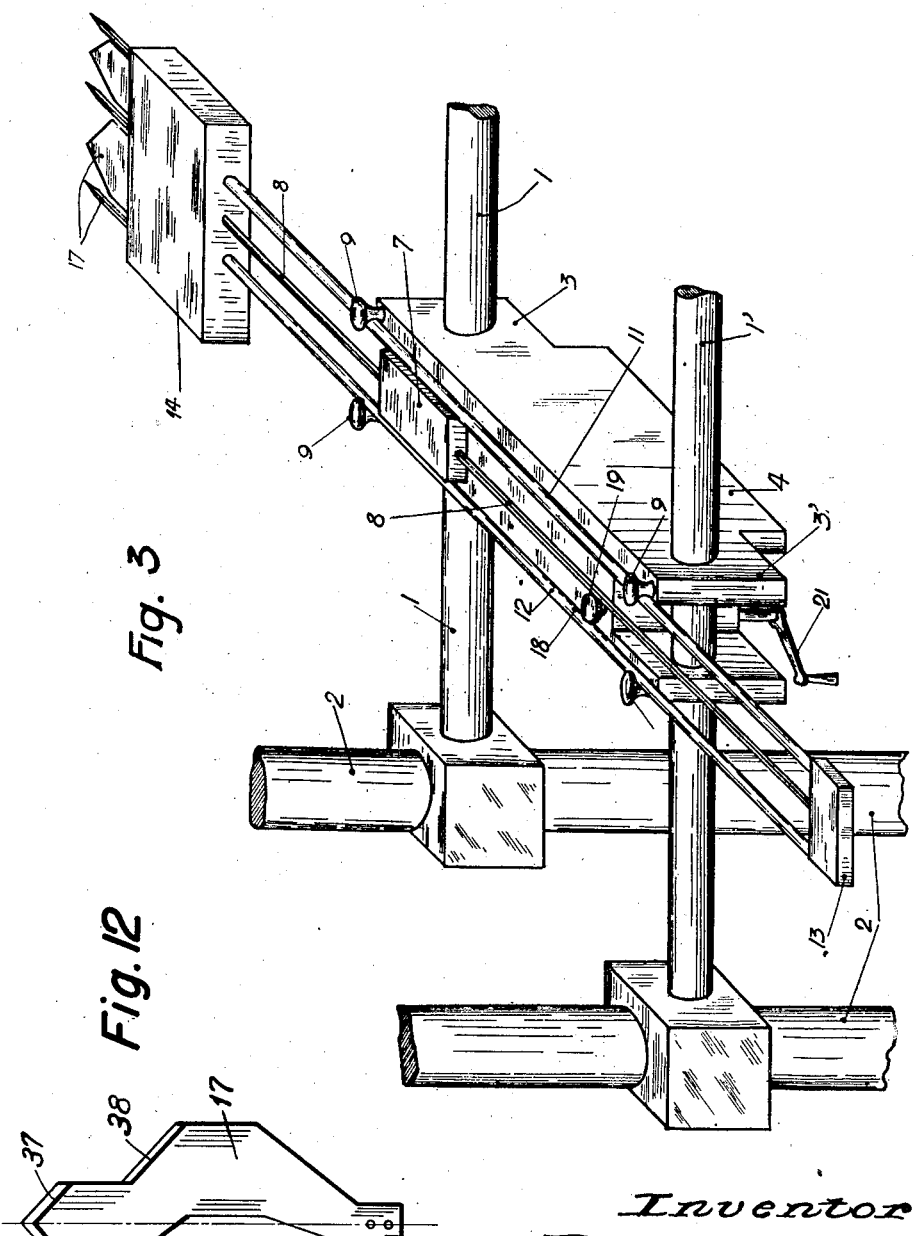

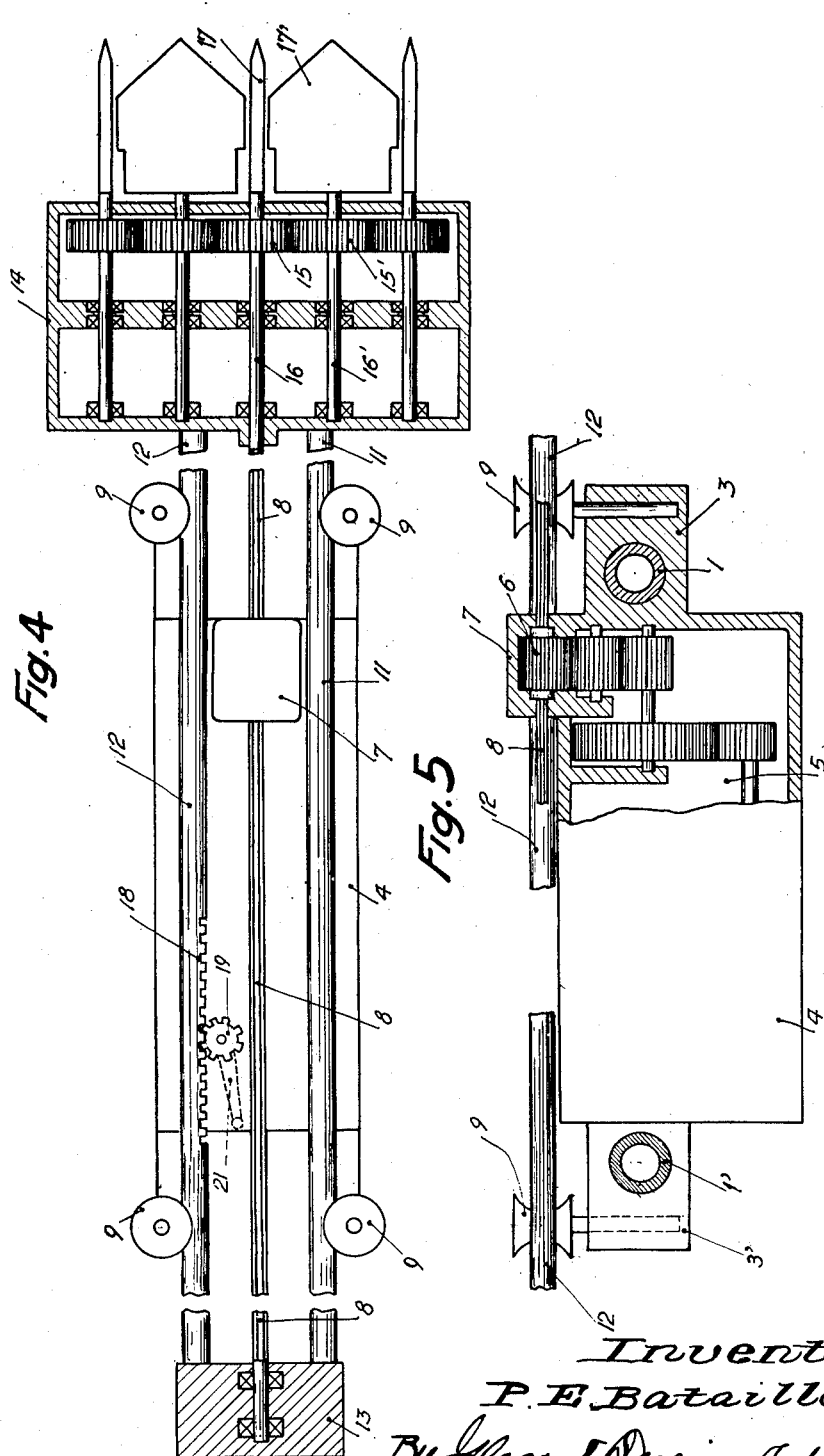

2,582,521

UNITED STATES PATENT OFFICE 2,582,521

MACHINE FOR MINING TENDER STONES OR OTHER MINERAL SUBSTANCES

Pierre Eugène Bataille, Emeville, France, assignor to Société des Carrieres de l'Oise et de la Meuse, Crepy-en-Valois, Oise, France Application August 17, 1945, Serial No. 610,952
In France August 20, 1943

Section 1, Public Law 690, August 8, 1946
Patent expires July 13, 1964

6 Claims. (Cl. 262—22)

The object of the present invention is a machine for the mining of stones or any other mineral substance found in compact masses in the ground and the essential feature of this machine consists in a working device constituted by a plurality of parallel rotating bits or cutters which enter the stone in such a manner that the holes bored by the various cutters are in overlapping relationship relatively to one another. As a result, the working device in question produces in the stone, not a plurality of holes, but an actual continuous kerf-like cut having the length of the operating part. By thus producing a suitable number of kerfs in the stone, it is possible to separate the blocks it is desired to extract.

In a particularly advantageous arrangement, the cutters each comprise a substantially flat blade having a greater width than that of the cutter rod and in order that these cutters may operate simultaneously, they are offset relatively to one another in such a manner that the plane of one cutter forms an angle of about 90° with the plane of the adjoining cutter.

It is also preferable to rotate adjoining cutters in the opposite direction, whereby clogging is avoided. This result is very simply achieved by providing, for driving the cutter rods, mutually meshing gears.

The machine itself essentially comprises a guiding device parallel to the working face and along which may slide a driving device which carries in its turn, in such a manner as to allow of its sliding perpendicularly to the working face, a frame carrying the box which contains the bits or cutters and in which are mounted the required parts for transmitting to the bits or cutters the rotary movement derived from the driving device.

Generally, this guiding device is constituted by tubular rods forming part of a scaffolding made of metal tubes. These rods may move along stationary tubes which are perpendicular thereto, said tubes forming vertical columns or, on the contrary, horizontal elements, depending on the kind of work required from the machine. The stationary parts of the scaffolding are engaged in the ground or in the stone if the kind of work permits this. It is desirable, in particular, that these tubes be provided with a lengthening or shortening device which nevertheless enables the end supports of the tubular guiding rod to slide on the whole of their length.

The driving device is preferably protected by a casing containing the motor proper and a change speed gear, the last wheel of this change speed gear rotating a shaft carried by the frame and controlling the movement of the bits, whilst it is adapted to slide in relation to the driving device, with the frame itself.

The various parts of the machine are so dimensioned as not to hinder the work. Thus, the dimensions of the box-frame both as regards height and breadth must be such that it may freely enter the kerf made by the cutters or bits. Likewise, the total height of the driving device and of the parts it carries, is such that the bits may operate immediately under the roof, on the ground level and in the prolongation of the galleries without the provision of special devices for this purpose.

Various other features of a machine in accordance with the present invention will be apparent from the description given hereinafter, relating to a form of embodiment chosen by way of example, with reference to the accompanying drawings, in which:

Fig. 1 is a diagrammatic view in elevation and on a large scale of the operating device.

Fig. 2 is a plan view showing the boring of holes by the various cutters.

Fig. 3 is a diagrammatical perspective view of the main part of the machine.

Fig. 4 is a plan view of the cutter carrying frame and of the casing placed thereunder.

Fig. 5 is an elevation, partly in section, of the driving device.

Fig. 6 is a diagrammatic end view of the trench-like cut made in the stone.

Figs. 7 and 8 are two views respectively in longitudinal sectional elevation and in transverse section of the end of one of the tubular columns of the scaffolding.

Fig. 9 is a diagrammatic plan view showing the device used for evacuating the stone dust produced when cutting the preceding trench.

Figs. 10 and 11 show in elevation modifications of the bits or cutters.

Fig. 12 is an elevational view of the bit or cutter as used in the embodiment of Fig. 11.

The operating device of the machine comprises (Figs. 1 and 2) a plurality of bits 17, 17' the parallel rods 16, 16' of which are adapted to rotate, by means of ball bearings, in a transverse member 14 playing the part of a frame. Each of these rods is integral with a gearing 15, 15' and the gears of two adjoining rods mesh with one another so that the two rods rotate in opposite directions when the gearing is caused to rotate by means of a suitable transmission, not shown.

As can be seen in Figs. 1 and 2, the cutters 17, 17' are substantially flat and have a cutting edge which penetrates into the stone. Each of these cutters, having approximately the form of a lance iron, is larger than the corresponding rod 16, 16'. In order that the cutters may work together, it is necessary that they be rotationally offset by a certain angle. It is seen in Figs. 1 and 2 that when the cutters 17 are substantially parallel to the plane of the figure, the cutters 17' are substantially perpendicular to this plane.

Under these conditions, if the frame 14 be imparted a forward movement of suitable speed in the direction of the arrow F, each cutter will drill a hole in the stone and these holes will overlap to a marked extent so that there will be obtained, not a plurality of more or less juxtaposed holes, but an actual kerf-like cut, as can be seen in Figure 2.

As a result of the rotation of the cutters taking place in the reverse direction, these cutters are mutually cleaned and clogging is avoided.

The machine which makes use of this working device comprises (Fig. 3) two tubular guiding rods 1, 1' the ends of which are slidably mounted on the metal tubes 2 forming part of a scaffolding composed of similar inter-braced tubes. In the present case, the tubular guiding rods are horizontal. It is obvious that, if they were to slide on horizontal tubes, they might also be vertical. In any case, the scaffolding is so arranged that the axes of the tubular guiding rods 1, 1' are parallel to the working face and in a plane perpendicular to the latter. The manner in which the suitably cross-braced scaffolding is fixed in relation to the working face will not be dwelt upon. Its columns such as 2 may be anchored in the ground and some of its horizontal tubes may be secured to the stone.

The tubular rods 1, 1' pass through the lugs 3, 3' of a casing 4 which is the casing of the motor device. The casing contains, in its rear portion, the motor proper (not shown) which may be, for example, an electric motor, and, in its front portion, a gearing 5, rotating a plurality of toothed wheels the last 6 of which (Fig. 5) is placed in an appendix 7 projecting above the casing 4. Through the appendix 7 passes the elongate shaft 8 of angular section, for example octagonal, which passes through a correspondingly shaped perforation provided in the toothed wheel 6. It is obvious that if the toothed wheel 6 rotates, it rotates the shaft 8; however the shaft 8 may slide in the toothed wheel 6.

The shaft 8 is mounted in a frame formed by two rods 11, 12 exhibiting at one end a block 13 constituting a bearing for the shaft and secured, at the other end, to the casing or box 14 in which are mounted the bit or cutter rods. The rods 11 and 12 are guided by spindles 9 mounted on the casing 4. The octagonal shaft 8 is prolonged in the box 14 by a cylindrical portion which causes, through the medium of gears 15, 15' . . . the rods 16, 16' . . . of the bits or cutters 17, 17' . . . to rotate.

In order to move the frame during the work and to move the box forward into the trench which it cuts, any suitable system may be used. Here (Figs. 3 and 4), a rack 18 on the rod 12, and a toothed wheel 19 actuated by a hand lever 21 for moving said rack, have been diagrammatically shown. It is obvious that any other system may be used with or without a catch device to prevent reverse rotation. It is also obvious that any suitable system might be used for moving the casing 4 along the tubular rods 1, 1'.

The work produced by a four-cutter box, when viewed from the front, has an appearance such as that shown in Fig. 6, the circular perforations bored by each cutter sufficiently overlapping one another to produce a broad kerf-like cut. In order to continue this cut, it will simply be necessary to transversally move the casing 4 by a suitable amount along the horizontal tubular rods 1, 1' and to resume the work. It is obvious that, in order that the work may be carried out, the box 14 must not encounter any resistance on its passage through the kerf-like cut, that is (if it be assumed that in Fig. 6 the section of said box is shown in dotted lines), the height and the width should be less than the minimum height and width of the trench. If it is desired to work in the immediate proximity of the roof or on the ground level, or in the gallery extensions, it is essential that the parts which project above the casing 4 (spindles 9, appendix 7) shall not exceed in height the casing 14.

If desired, a single control may be adopted for moving, by a single operation, the motor unit on the parallel guiding tubes and the frame and box into the mass.

However, this device must be such that any member whatever may be able to slide on the column to the end thereof, that is, the latter must maintain everywhere its cylindrical shape. This may be achieved by adopting the arrangement shown in Figs. 7 and 8. The tube is radially divided into a plurality of regularly alternating segments 23, 23', 23'' on the one hand and 24, 24', 24'' on the other hand. The segments 23, 23', 23'' form the lower end of the tube and provide openings in which enter the segments 24, 24', 24'' integral with the upper part of the tube and with a nut 25 screwed into a screw-threaded rod 26 integral with the point 27 which may be driven in the ground and which offers a hole 28 for the insertion of an actuating tool. It is obvious that if the point 27 is rotated, the screw-threaded rod 26 is rotated. The nut 25 moves along this rod, without rotating since the segments 24, 24', 24'' are guided by the segments 23, 23', 23''. The tube is therefore lengthened whilst retaining on the whole of its length the cylindrical shape which enables for example the supports of the tubular rod 1 to slide, such sliding movement being possible up to the end of the tube.

During the work of the cutters for the cutting of the kerf-like cuts, a considerable amount of stone dust is formed; there is a danger of this dust clogging the tools and it is therefore desirable that it be evacuated as rapidly as possible as the cutting operation proceeds. To this end (Fig. 9), a very flat frame may be used comprising two pulleys 31, 32 and an endless chain 33 provided with vanes 34. It has been assumed in Fig. 9 that in a preceding operation, the cutter box 14 has effected a cut to a depth P, and that the adjoining cut is being effected. The above mentioned frame is introduced as far as P and the hand lever 36 is rotated. Under these conditions, a very large amount of stone dust is evacuated.

It may be preferable to use, instead of cutters having the shape shown in Figs. 1, 4 and 9, cutters having a more open shape as shown in Fig. 10 and which are much less liable to clogging. These cutters 17, 17', like those of Figs. 1 and 2, are adapted to rotate in such a manner that two adjoining cutters rotate in opposite directions, the planes of the two cutters being offset by 90°.

However, as shown in Figs. 11, 12 it is possible to make use of cutters 17, 17' of such a shape that they all rotate in the same direction. Each cutter comprises a blade having a pointed cutting edge 37 the sharp end of which is located on the axis of rotation in order to initiate the bore, and a cutting edge 38 projecting laterally at one side and eccentrically with relation to the axis of rotation for enlarging the bore, whereas the opposite side of each cutter is recessed to provide clearance for the lateral projection of the adjacent cutter. This arrangement affords definite advantages over the prior art devices particularly with respect to the packing of the stone dust. In Fig. 11 the cutting portions of the blades have been shown in thicker lines.

I claim:

1. In a machine for mining mineral substances existing in compact masses in the ground to bore holes in overlapping relation, a frame, parallel rods rotatably mounted in said frame, means for rotating the several rods in the same direction and at the same speed, cutters fixed to said rods, each cutter having a pointed cutting end located in the axis of rotation thereof and having a cutting part projecting laterally at one side and eccentrically with relation to the axis of rotation for forming a bore of large diameter, the opposite side of each cutter being recessed to provide a space for the passage of the lateral projection of the adjacent cutter.

2. A cutting machine for mining mineral substances existing in compact masses comprising guiding means adapted to be positioned parallel to the plane of the cut, a casing movable along said guiding means, a power device and a gear train connected thereto within said casing, a frame movable on said casing perpendicular to the plane of the cut, a shaft rotatably mounted on said frame, a cutting device comprising parallel cutters rotatably mounted in said frame and driven by said shaft in such manner that the shaft may slide longitudinally with the frame, said frame including bars slidably engaged with said casing and one of said bars having teeth thereon, an adjusting pinion mounted on said casing and meshing with said teeth, and an operating crank for said pinion journaled in said casing.

3. A cutting machine for mining mineral substances existing in compact masses comprising guiding means adapted to be positioned parallel to the plane of the cut, a casing movable along said guiding means, a power device and a gear train connected thereto within said casing, a frame movable on said casing perpendicular to the plane of the cut, a shaft rotatably mounted on said frame, a cutting device comprising parallel cutters rotatably mounted in said frame and driven by said shaft in such manner that the shaft may slide longitudinally with the frame, said frame including bars slidably engaged with said casing, and means for moving said frame transversely of said guiding means and longitudinally of said casing.

4. A cutting machine for mining mineral substances existing in compact masses comprising guiding means adapted to be positioned parallel to the plane of the cut, a casing movable along said guiding means, a power device and a gear train connected thereto within said casing, a frame movable on said casing perpendicular to the plane of the cut, a shaft rotatably mounted on said frame and connected to one member of said gear train for rotation therewith and slidable movement with respect thereto, a cutting device comprising parallel cutters rotatably mounted in said frame and driven by said shaft, said frame including bars slidably engaged with said casing, and means for moving said frame transversely of said guiding means and longitudinally of said casing.

5. A cutting machine for mining mineral substances existing in compact masses comprising guiding means adapted to be positioned parallel to the plane of the cut, a casing movable along said guiding means, a power device and a gear train connected thereto within said casing, a frame movable on said casing perpendicular to the plane of the cut, a shaft rotatably mounted on said frame and splined within one member of said gear train for rotation therewith and slidable movement with respect thereto, a cutting device comprising parallel cutters rotatably mounted in said frame and driven by said shaft, said frame including bars slidably engaged with said casing, and means for moving said frame transversely of said guiding means and longitudinally of said casing.

6. A cutting machine for mining mineral substances existing in compact masses comprising guiding means adapted to be positioned parallel to the plane of the cut, a casing movable along said guiding means, a power device and a gear train connected thereto within said casing, a frame comprised by a forward housing, a rear block and parallel connecting rods extending longitudinally of said casing movable longitudinally of said casing, guide means on said casing for said connecting rods, a shaft rotatably mounted on said frame and connected to one member of said gear train for rotation therewith and slidable movement with respect thereto, a cutting device comprising parallel cutters rotatably mounted in said forward housing and driven by said shaft, and means for moving said frame transversely of said guiding means and longitudinally of said casing.

PIERRE EUGÈNE BATAILLE.

REFERENCES CITED

The following references are of record in the file of this patent:

UNITED STATES PATENTS

| Number | Name | Date |
| --- | --- | --- |
| 458,868 | Van Depoele | Sept. 1, 1891 |
| 591,449 | Blair | Oct. 12, 1897 |
| 1,696,576 | Jones | Dec. 25, 1928 |
| 1,836,250 | Holmes | Dec. 15, 1931 |
| 2,194,466 | Cadwallader | Mar. 26, 1940 |

FOREIGN PATENTS

| Number | Country | Date |
| --- | --- | --- |
| 1,316 | Great Britain | 1878 |